(12) United States Patent
Cutler et al.

(10) Patent No.: US 9,035,762 B2
(45) Date of Patent: May 19, 2015

(54) METHOD AND SYSTEM FOR LOCATING SIGNAL EMITTERS USING CROSS-CORRELATION OF RECEIVED SIGNAL STRENGTHS

(75) Inventors: Robert Thomas Cutler, Everett, WA (US); Deitrich Werner Vook, Los Altos, CA (US); Andrew David Fernandez, San Jose, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 1560 days.

(21) Appl. No.: 12/325,708

(22) Filed: Dec. 1, 2008

(65) Prior Publication Data

US 2010/0134309 A1 Jun. 3, 2010

(51) Int. Cl.
| | |
|---|---|
| G08B 1/08 | (2006.01) |
| G08G 1/123 | (2006.01) |
| G01S 13/08 | (2006.01) |
| G05D 1/02 | (2006.01) |
| G06F 17/10 | (2006.01) |
| G06G 7/78 | (2006.01) |
| G01C 9/00 | (2006.01) |
| G01C 17/00 | (2006.01) |
| G01C 19/00 | (2013.01) |
| H04B 17/00 | (2006.01) |

(52) U.S. Cl.
CPC .................................. *H04B 17/0072* (2013.01)

(58) Field of Classification Search
CPC .................................. G01S 5/0278; G01S 5/06
USPC ......... 342/118, 174, 108, 145, 189, 378–384, 342/146, 450–465; 340/825.49, 539.13, 340/988–996; 701/200–300; 702/150–153
See application file for complete search history.

(56) References Cited

U.S. PATENT DOCUMENTS

| | | | | |
|---|---|---|---|---|
| 4,215,345 | A * | 7/1980 | Frosch et al. | 342/465 |
| 4,494,119 | A * | 1/1985 | Wimbush | 342/457 |
| 6,720,876 | B1 * | 4/2004 | Burgess | 340/568.1 |
| 6,734,824 | B2 * | 5/2004 | Herman | 342/465 |
| 6,765,533 | B2 * | 7/2004 | Szajnowski | 342/465 |
| 7,308,276 | B2 * | 12/2007 | Goren et al. | 455/456.5 |
| 2001/0046869 | A1 * | 11/2001 | Cedervall et al. | 455/456 |
| 2004/0022214 | A1 * | 2/2004 | Goren et al. | 370/332 |
| 2006/0267833 | A1 * | 11/2006 | Langford et al. | 342/174 |

OTHER PUBLICATIONS

IEEE 100: the Authoritative Dictionary of IEEE Standards Terms. New York: Standards Information Network, IEEE, 2000. Print. pp. 2, 253, 658.*

Taub, Herbert, and Donald L. Schilling. Principles of Communication Systems. New York: McGraw-Hill Publishing Company, 1986, 1971. Print. pp. 28-32.*

(Continued)

*Primary Examiner* — Jennifer Mehmood
*Assistant Examiner* — Emily C Terrell

(57) ABSTRACT

A method and system for determining a location of a first device that emits a signal: provide at least three sensors separated and spaced apart from each other; at each of the sensors, receive the signal emitted by the first device; determine the received signals for each of the sensors; determine cross-correlations of the received signals for pairs of the sensors; and determine the location of the first device from the magnitudes of the cross-correlations of the received signals.

22 Claims, 10 Drawing Sheets

(56) References Cited

OTHER PUBLICATIONS

Ho, K. C., Kovavisaruch L., Parikh, H. Source Localization Using TDOA with Erroneous Receiver Positions. 2004 Institute of Electrical and Electronics Engineers, Inc. pp. III-453-III-456.*

Aso, M, Kawabata, M, Hattori, T. A New Location Estimation Method Based on Maximum Likelihood Function in Cellular Systems. 2001 IEEE 54$^{th}$ Vehicle Technology Conference v1, p. 106-110.* http://en.wikipedia.org/wiki/Multilateration.
http://en.wikipedia.org/wiki/Trilateration.
http://en.wikipedia.org/wiki/Angle_of_Arrival.
http://en.wikipedia.org/wiki/Received_Signal_Strength_Indication.

* cited by examiner

METHOD AND SYSTEM FOR LOCATING SIGNAL EMITTERS USING CROSS-CORRELATION OF RECEIVED SIGNAL STRENGTHS

BACKGROUND

There are a number of applications where it is desirable to be able to identify an unknown location of an object which emits a signal. One example occurs when planning an indoor wireless local area network (LAN) having one or more RF or microwave emitters.

Of course precisely defining an object's location requires specifying coordinates in three dimensions (e.g., longitude, latitude, and altitude). In the discussion to follow, for simplicity of explanation it is assumed that the third coordinate (i.e., altitude) is either known or is otherwise easily determined once the other two coordinates (e.g., latitude and longitude) are identified. Those skilled in the art will be able to extrapolate the discussion to follow to the case where all three coordinates are to be determined.

There are a few known methods to locate signal emitters using a plurality of distributed sensors, or receivers, which are spaced apart from each other. Among the most common of these methods are: Time Difference of Arrival (TDOA), Time of Arrival (TOA), Angle of Arrival (AOA), and Received Signal Strength (RSS).

The TDOA method, also known sometimes as multilateration or hyperbolic positioning, is a process of locating an emitter by accurately computing the time difference of arrival (TDOA) of a signal emitted from the emitter to three or more sensors. In particular, if a signal is emitted from a signal emitter, it will arrive at slightly different times at two spatially separated sensor sites, the TDOA being due to the different distances to each sensor from the emitter. For given locations of the two sensors, there is a set of emitter locations that would give the same measurement of TDOA. Given two known sensor locations and a known TDOA between them, the locus of possible locations of the signal emitter lies on a hyperbola. In practice, the sensors are time synchronized and the difference in the time of arrival of a signal from a signal emitter at a pair of sensors is measured. With three or more sensors, multiple hyperbolas can be constructed from the TDOAs of different pairs of sensors. The location where the hyperbolas generated from the different sensor pairs intersect is the most likely location of the signal emitter.

In the TOA method, a signal emitter transmits a signal at a predetermined or known time. Three or more sensors each measure the arrival time of the signal at that sensor. The known time of arrival leads to circles of constant received time around each sensor. The locations where the circles from the three or more sensors intersect are the most likely location of the signal emitter.

In the AOA method, the angle of arrival of the signal is measured with special antennas at each receiver. This information is combined to help locate the signal emitter.

In the RSS method, the power of the received signal at each sensor is measured, and this information is combined to help locate the signal emitter. There are a few different emitter location procedures that employ RSS. For example, one commonly used method in planning indoor wireless LAN systems in a building of interest is to map the received signal strength at various locations around the building during a setup phase. From this map, a variety of algorithms can be used to locate the signal emitter based on computed received power at three or more sensors.

A more detailed explanation of principles employed in an RSS method of locating a signal emitter will now be provided, particularly illustrating a case involving an RF emitter and RF sensors.

FIG. 1 illustrates a general case of an RF emitter 110 and two RF sensors 122 and 124.

In free space, the received power of a signal transmitted by RF emitter 110 decreases with the square of the distance from RF emitter 110. For indoor or dense urban environments the power fall-off is even steeper, for example $r^{-3}$ or $r^{-4}$, where r is the distance from RF emitter 110. In general, given a transmitted power $P_0$ measured at distance $r_0$, the power $P_1$ received at first RF sensor 122 is:

$$P_1 = P_0 \left(\frac{r_0}{r_1}\right)^n, \quad (1)$$

where $r_1$ is the distance between RF emitter 110 and first RF sensor 122, and n is the exponential rate at which the power decreases with distance.

Likewise the received power $P_2$ at second RF sensor 124 is:

$$P_2 = P_0 \left(\frac{r_0}{r_2}\right)^n, \quad (2)$$

where $r_2$ is the distance between RF emitter 110 and second RF sensor 124.

This leads to:

$$\frac{P_1}{P_2} = \left(\frac{r_2}{r_1}\right)^n \quad (3)$$

With a bit of manipulation this yields:

$$10^{\left(\frac{\log(P_1/P_2)}{n}\right)} = \left|\frac{r_2}{r_1}\right| = const = \alpha \quad (4)$$

It can be shown that this leads to a circle of a given radius and centered on the line defined by the two RF sensors. FIG. 2 illustrates an exemplary circle generated by power measurements of a signal transmitted by RF emitter 110 and received at RF sensors 122 and 124.

With at least three RF sensors, three such circles are generated, and the location of RF emitter 100 can be found where the three circles intercept. With many sensors, it is possible to increase the accuracy by determining the point where most of the generated circles intersect.

However, the addition of measurement uncertainty and noise makes this a difficult problem to solve analytically with a high degree of accuracy.

Moreover, using just the measured signal power, as it typical in most RSS methods, multiple emitters transmitting from different locations at the same time with the signals having the same characteristics (e.g., frequency, bandwidth, etc.) leads to confusing results for the emitter location.

Furthermore, with existing equipment, it is often difficult for a troubleshooter to easily and efficiently view all of the relevant data of interest to allow a clear picture of any coverage and interference issues. More robust data analysis and data presentation capabilities are needed. In particular, methods are needed that are robust when multiple emitters are present that transmit signals at the same time and on the same frequency.

What is needed, therefore, is a method and system for locating signal emitters that addresses one or more of these shortcomings.

SUMMARY

In an example embodiment, a method is provided for determining the location of a first device that emits a signal. The method includes: providing at least three sensors separated and spaced apart from each other; at each of the sensors, receiving the signal emitted by the first device; acquiring the received signals for each of the sensors; determining magnitudes of cross-correlations between the received signals for pairs of the sensors; and determining the location of the first device from the magnitudes of the cross-correlations of the received signals.

In another example embodiment, a system determines a location of a first device that emits a signal. The system comprises: at least three sensors separated and spaced apart from each other, each of the sensors including a receiver adapted to receive the signal emitted by the first device and to acquire the received signals for each of the sensors; a network connecting the sensors and adapted to communicate data from the sensors; means for determining magnitudes of the cross-correlations of the received signals for pairs of the sensors; and means for determining the location of the first device from the magnitudes of the cross-correlations of the received signals.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Figure 1:
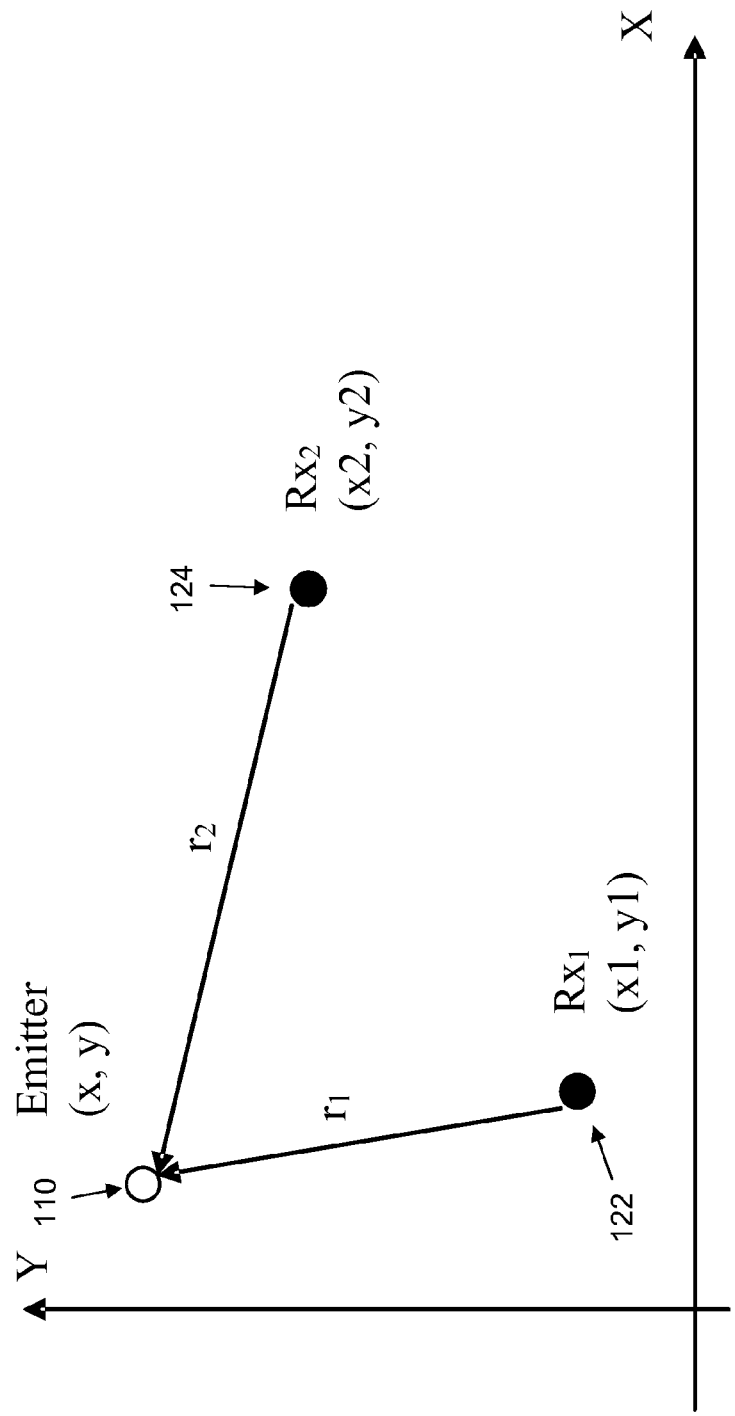
FIG. 1 illustrates a general case of a signal emitter and two sensors.
Figure 2:
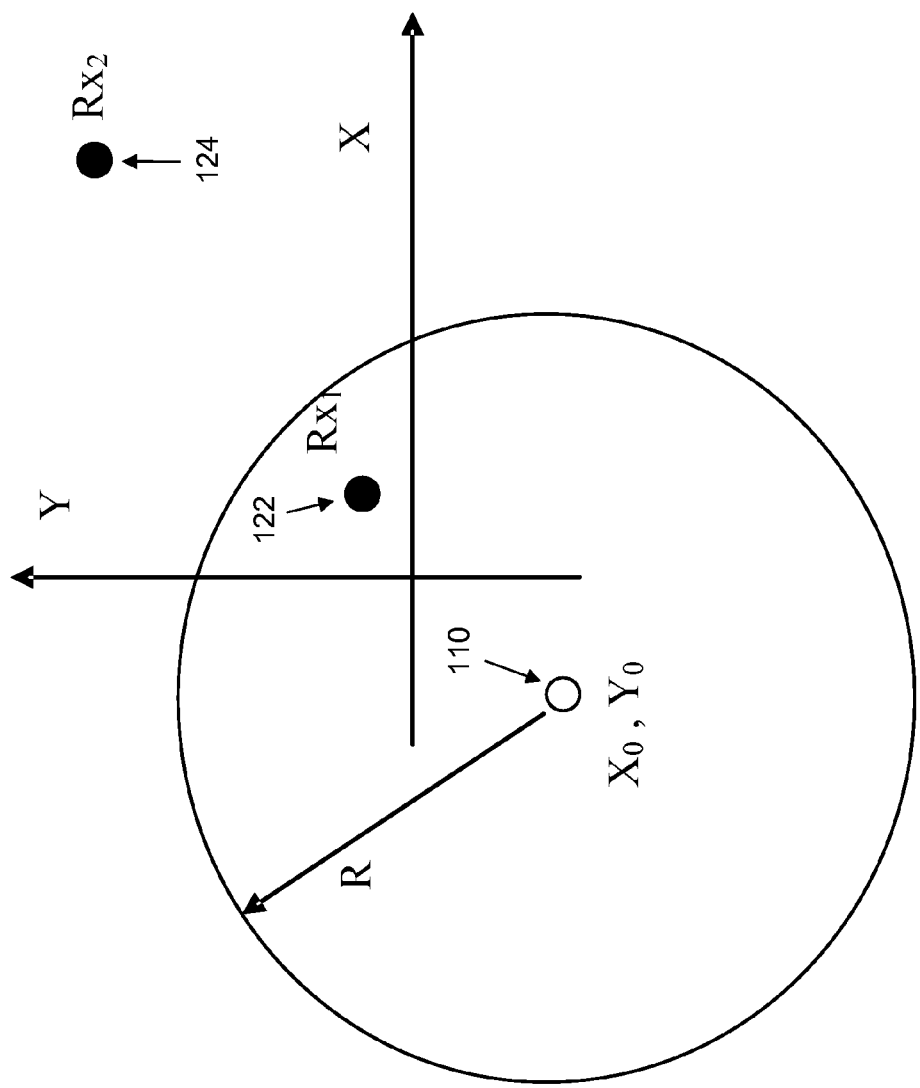
FIG. 2 illustrates an exemplary circle generated by power measurements of a signal transmitted by an emitter and received at spatially-separated sensors.
Figure 3:
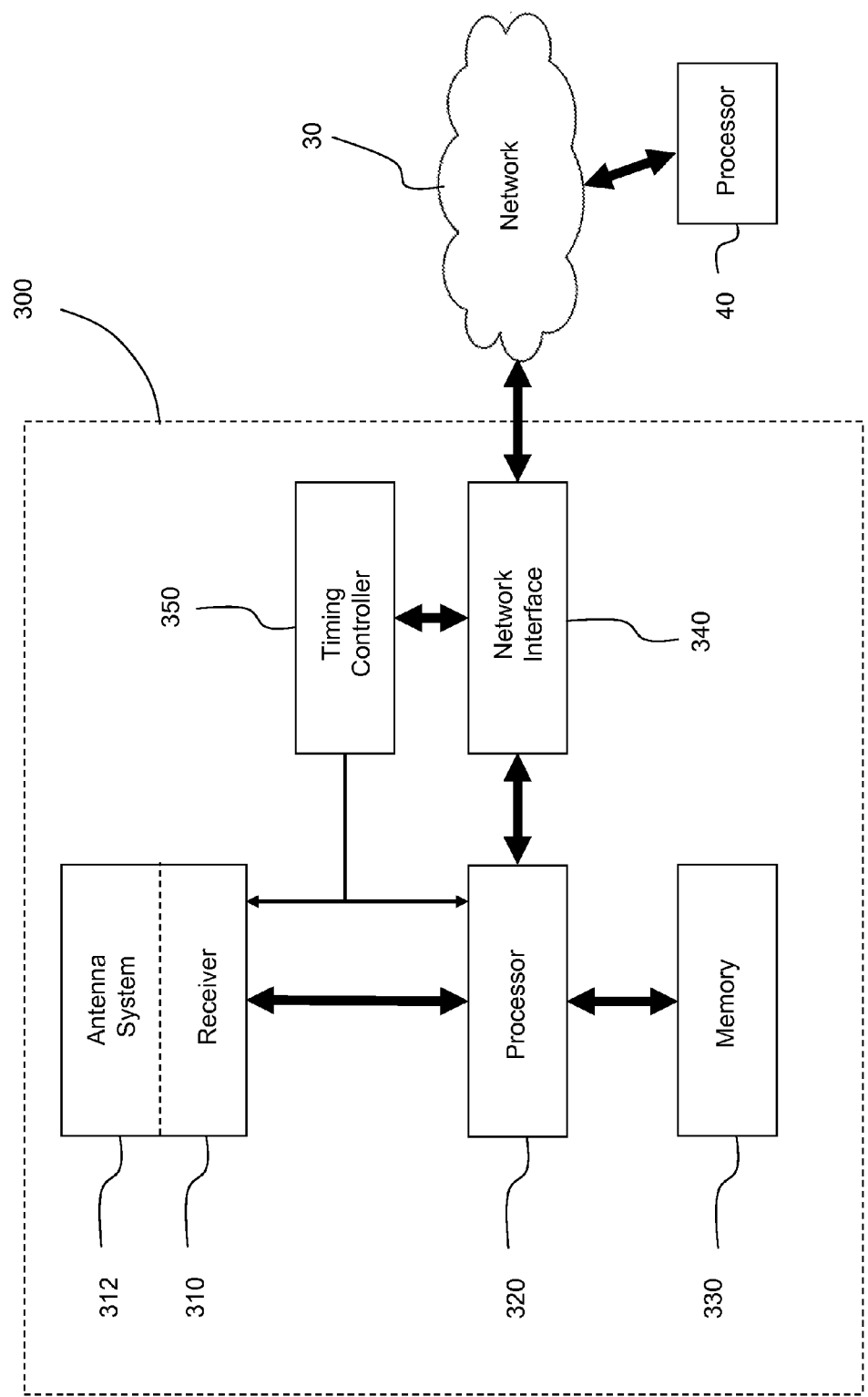
FIG. 3 shows a functional block diagram of one embodiment of a sensor that may be employed in a system for locating signal emitters.

FIG. 3 shows a functional block diagram of one embodiment of a sensor 300 that may be employed in a system for locating signal emitters. As will be appreciated by those skilled in the art, one or more of the various "parts" shown in FIG. 3 may be physically implemented using a software-controlled microprocessor, hard-wired logic circuits, or a combination thereof. Also, while the parts are functionally segregated in FIG. 3 for explanation purposes, they may be combined variously in any physical implementation.

Sensor 300 includes a receiver 310, a processor 320, a memory 330, a network interface 340, and a timing controller 350. In some embodiments, receiver 310 includes, or is connected to, an antenna system 312.

Receiver 310 provides functionality for system 300 to receive and process a signal (e.g., an RF signal, a microwave signal, an acoustic signal, etc.) received from a signal emitter. In some embodiments, receiver 310 is able to simultaneously receive signals from a plurality of different signal emitters.

Processor 320 is configured to execute one or more software algorithms in conjunction with memory 330 to provide functionality for sensor 300. Beneficially, processor 320 includes its own memory (e.g., nonvolatile memory) for storing executable software programming code that allows it to perform the various functions of sensor 300. Alternatively, or additionally, executable code may be stored in designated memory locations within memory 330.

Memory 330 stores data and/or software programming code used in operations of sensor 300.

Network interface 340 interfaces sensor 300 to a network 30 that includes a plurality of other sensors 300. By means of network 30, sensors 300 may share or communicate information with each other, and/or to a central controller or processor 40 that may be connected via network 30.

Timing controller 350 controls the timing of signal processing operations in sensor 300. In a beneficial arrangement, sensor 300 shares timing information with other sensors 300 in network 30 via network interface 340. In one embodiment, timing controllers 350 of sensors 300 in network 30 are synchronized with each other to have a common sense of time. In one embodiment, timing controllers 350 in sensors 300 may obtain a common sense of time via a precision timing protocol (PTP) of IEEE-1588. In such a case, central controller or processor 40 may include a master clock for sensors 300 in network 30, or a separate dedicated master clock may be provided in network 30. In another embodiment, one of the timing controllers 350 in one of the sensors 300 may operate as a master clock for sensors 300 in network 30.

In an alternative embodiment, a sensor that may be employed in a system for locating signal emitters could be a simple probe at the end of a wire or fiber that remotely connects to a central receiver and/or processor.

Now a method and system of locating signal emitters using the power derived from the cross-correlations of received signals at three or more sensors will be explained The power of a signal transmitted from an emitter decreases with increasing distance "r" from the emitter as $r^{-n}$ as shown in equation (1) above. Therefore, the magnitude of the signal decreases as $r^{-n/2}$. In general, given a transmitted signal with magnitude $A_0$, the magnitude $A_1$ of the signal received at a first sensor "1" is:

$$A_1 = A_0 * r_1^{-n/2} \qquad (5)$$

where $r_1$ is the distance between the emitter and the first sensor, and n is the path loss exponent. This represents the exponential rate at which transmitted power is attenuated with distance.

Likewise the magnitude $A_2$ of the signal received at a second sensor "2" is:

$$A_2 = A_0 * r_2^{-n/2} \qquad (6)$$

Therefore, the peak cross-correlation power $X_{12}$ between the first and second sensors "1" and "2" can be represented as:

$$X_{12} = A_0^2 * r_1^{-n/2} r_2^{-n/2} [\Sigma \ldots] \qquad (7)$$

where the term "[Σ . . . ]" represents the cross-correlation sums (or integrals, if continuous terms are used).

Assuming that there are N sensors, similar equations hold for $X_{13}, X_{14}, \ldots, X_{1N}, X_{23}, \ldots, X_{2N}, \ldots, X_{(N-1)N}$.

Taking ratios of these "cross-correlation powers" yields:

$$\frac{X_{12}}{X_{13}} = A_0^2 * r_1^{-n/2} * r_2^{-n/2} * A_0^{-2} * r_1^{n/2} * r_3^{n/2} = \left(\frac{r_3}{r_2}\right)^{n/2} \qquad (8)$$

Here, it is assumed that the received signals are sufficiently similar that the cross-correlation sums term [Σ . . . ] for $X_{12}$ cancels with the cross-correlation sums term [Σ . . . ] for $X_{13}$. It is also seen that the terms related to the first sensor drops out. Also, if the indices of the cross-correlation are the same as each other, then equation (8) reduces to the autocorrelation. The peak of the autocorrelation is the same as equation (3) above for the power-based RSS method of locating an emitter.

Following a similar logic to that for power-based RSS emitter location as discussed above, we obtain:

$$10^{\left(\frac{\log\left(\frac{X_{12}}{X_{13}}\right)}{n/2}\right)} = \left|\frac{r_3}{r_2}\right| = const = \theta_{23(1)} \qquad (9)$$

This means that the cross-correlation RSS contours are again circles, centered at a point $X_0, Y_0$, with radius R, where $X_0, Y_0$, and R are defined by:

$$X_0 = (\theta^2 * x_1 - x_2)/\lambda \qquad (10)$$

$$Y_0 = (\theta^2 * y_1 - y_2)/\lambda \qquad (11)$$

$$R^2 = [(\theta^2 y_1 - y_2)^2/\lambda^2 - (\theta^2 y_1^2 - y_2^2)/\lambda + (\theta^2 x_1 - x_2)^2/\lambda^2 - (\theta^2 x_1^2 - x_2^2)/\lambda] \qquad (12)$$

where $\lambda = (\theta^2 - 1)$, and where $(x_1, y_1)$ and $(x_2, y_2)$ refer to the x,y locations of the two sensors (e.g., sensors "1" and "2") that are NOT common between the two cross-correlations whose ratio is being calculated.

It can be seen from equation (9) that ratios of various pairs of cross-correlation powers will lead to circles of constant probability for the emitter's location. The emitter's location is given by the intersection or proximity of these constant probability circles. Alternately, the emitter's location may be estimated using a likelihood map formed from deviations from the path loss relationship expressed in equation (9) at each point in space. The location of the emitter is represented by the location on the map corresponding to the greatest likelihood. The details of this approach are set forth in U.S. patent application Ser. No. 12/326,020, "Likelihood Map System for Localizing an Emitter," filed in the names of inventors Andrew Fernandez, David Gines, Robert Cutler, and Dietrich Vook filed on even date with this patent application.

So, the peak "powers" of the auto-correlations of the received signals from multiple sensors may be employed as inputs to the RSS equations which are used in power-based RSS methods of locating an emitter. Also, ratios of the peak powers of the cross-correlations of time domain received signals from multiple sensors may be used as inputs to the RSS equations $$\left(e.g., \frac{\max[X_{12}]}{\max[X_{13}]}\right)$$

where $X_{12}$ is the cross-correlation of the signals received at sensors "1" and "2" and $X_{13}$ is the cross-correlation of the signals received at sensors "1" and "3.").

When deriving the power from the cross-correlation operations of the received signals the two sensors involved in a cross-correlation should be properly aligned in time. Therefore, in a beneficial arrangement, the sensors share a common sense of time, or are synchronized in time. Also, to produce good cross-correlation results, it is beneficial that any frequency differences between two sensors involved in a cross-correlation should be eliminated or minimized to prevent de-correlation of the signals.

Methods of locating an emitter using the peak of the cross-correlations of signals from pairs of sensors may present several advantages over a power-based RSS method. One significant advantage of the cross-correlation RSS over a power-based RSS method is improved performance under poor signal-to-noise ratio (SNR) conditions. Under the reasonable assumption that the noise or localized interference at each sensor is uncorrelated to the noise or localized interference at all other sensors, the cross-correlation computation provides a processing gain to the measured data. The amount of processing gain is a function of the duration over which a signal is present and observed. This is not true for the power-based RSS approach, as the noise and signal cannot be separated. The RSS approach is biased by the noise in that the expected receive power is the sum of the received power and the received noise power under the assumption that the noise and signal are uncorrelated. A second advantage of the cross-correlation RSS method described above is that it is less sensitive to timing errors than cross-correlation based TDOA techniques as the magnitude of the cross-correlation peak is used, not its position. Finally, unlike the RSS approach, the cross-correlation method has the potential for simultaneously resolving the location of multiple co-channel emitters.

In similarity to power-based RSS methods, Doppler compensation may be applied to the cross-correlation RSS measurements to improve the accuracy of the cross-correlation results in the case of moving transmitters, receivers, reflectors, etc.

Figure 4:
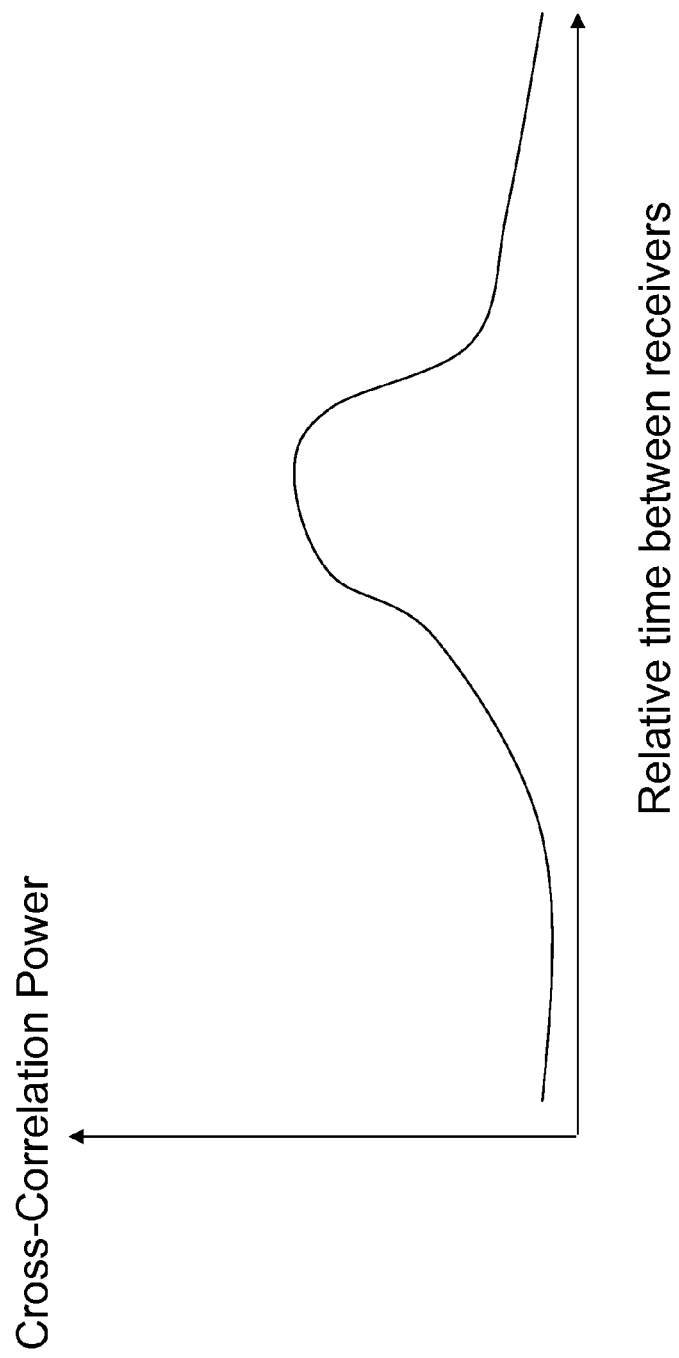
FIG. 4 shows an exemplary plot of cross-correlation power vs. relative time offset for the case of a single emitter.

FIG. 4 shows an exemplary plot of cross-correlation power vs. relative time offset for the case of a single emitter. It can be seen that the cross-correlation power has a peak at a particular time offset between the two sensors involved in the cross-correlation which depends on the relative location of the emitter with respect to the two sensors.

Figure 5:
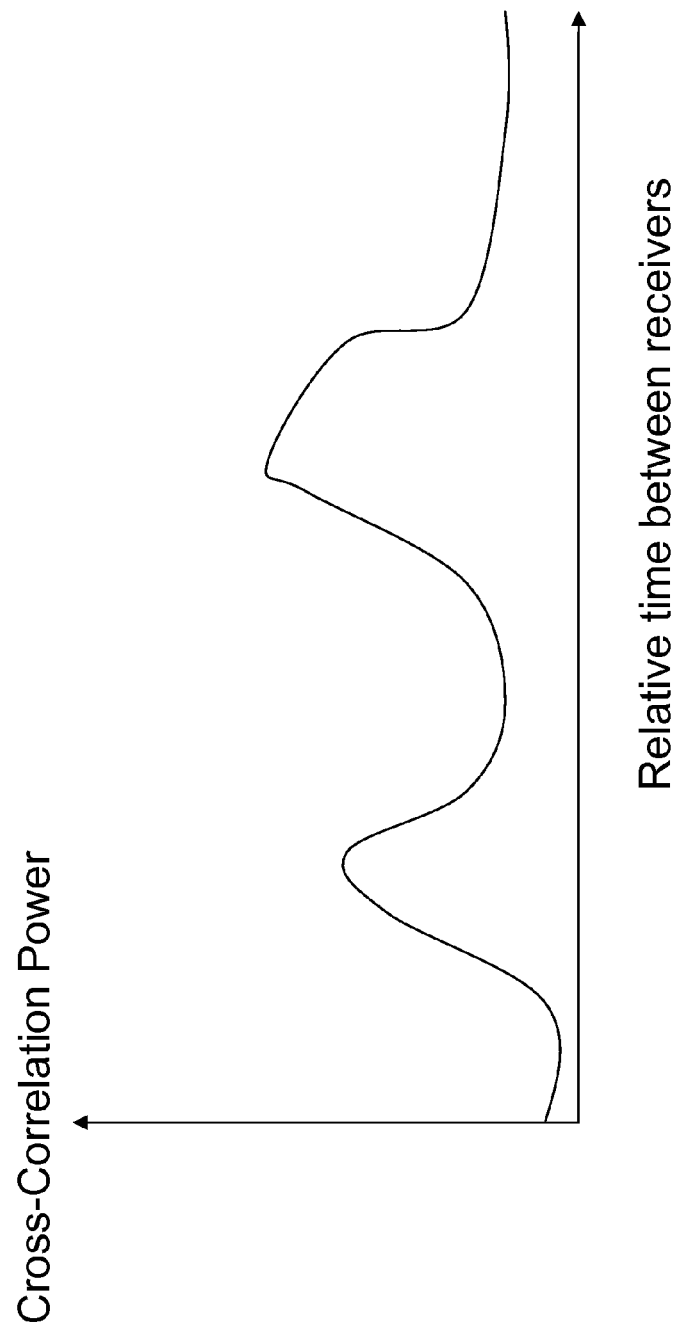
FIG. 5 shows an exemplary plot of cross-correlation power vs. relative time offset for the case of two emitters.

FIG. 5 shows an exemplary plot of cross-correlation power vs. relative time offset for the case of two unrelated emitters. As seen in FIG. 5, the cross-correlation of the received signals at two different sensors will have a peak for each physically separate emitter. Using the 1/(A-B) type of function described above, with the peaks of the cross-correlations $X_{12}$, $X_{13}$, etc. generates a set of circles. Using the cross-correlation power at the time offset corresponding to the difference in time from the two receivers to a test point, $\Delta t = r_1/c - r_2/c$, leads to a robust solution for multiple emitters. In some geometries, peaks will overlap if the emitters are the same distances from both sensors. However, these peaks will not overlap on other cross-correlation plots for different pairs of sensors in the emitter location system. It should be noted again that FIG. 5 illustrates a case where the emitters are unrelated. That is, while the two emitters may be transmitting at the same time and on the same frequency, their transmissions are generally uncorrelated to each other. That is, the expected value of the cross-correlation function is zero.

Figure 6:
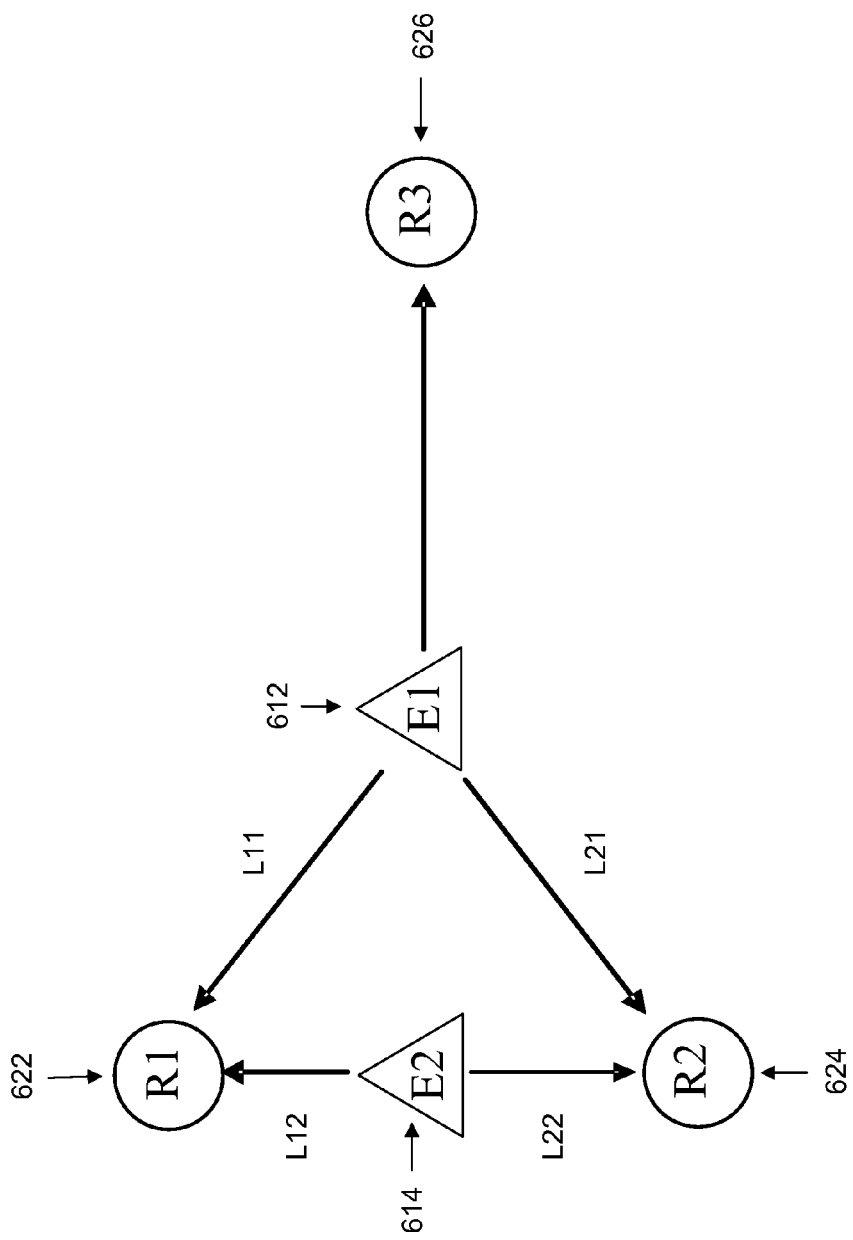
FIG. 6 illustrates an emitter location system with three sensors in the case of two emitters.

FIG. 6 illustrates an emitter location system 600 with three sensors 622, 624 and 626 in the case of two emitters 612 and 614. One or more of the sensors 622, 624 and 626 may have the configuration of sensor 300 of FIG. 3. Also, some of all of the sensors 622, 624 and 626 may be connected by a network (e.g., network 30) to share data and facilitate the cross-correlation calculations. The cross-correlation calculations may be performed at a central controller or processor (e.g., processor 40), or at a processor (e.g., processor 320) of one or more of the sensors 622, 624 and 626. In another embodiment, a processor in one of the sensors 622, 624 and 626 performs the cross-correlation calculations.

With the two emitters 612, 614, a standard RSS power measurement would have the powers of signals from the two emitters 612 and 614 adding at the various sensors. However, the cross-correlations $X_{13}$ and $X_{23}$ would be both double peaked, as illustrated in FIG. 5, while (assuming that L11=L21 and L12=L22,) $X_{12}$ would be single peaked as the time records measured at sensors 622 and 624 would be identical.

For non-stationary signals, the estimates of cross-correlation power are influenced by the period in time over which the signal is observed. Accordingly, in a beneficial embodiment, sensors 622, 624 and 626 in emitter location system 600 are synchronized in time with each other to have a common sense of time. Synchronization provides some assurance that the same signal is measured at all sensors in time-multiplexed (e.g. TDD) signal environments. It also assures accurate cross-correlation power estimates on signals measured at different points in space when the signal has amplitude and/or phase modulation.

Figure 7:
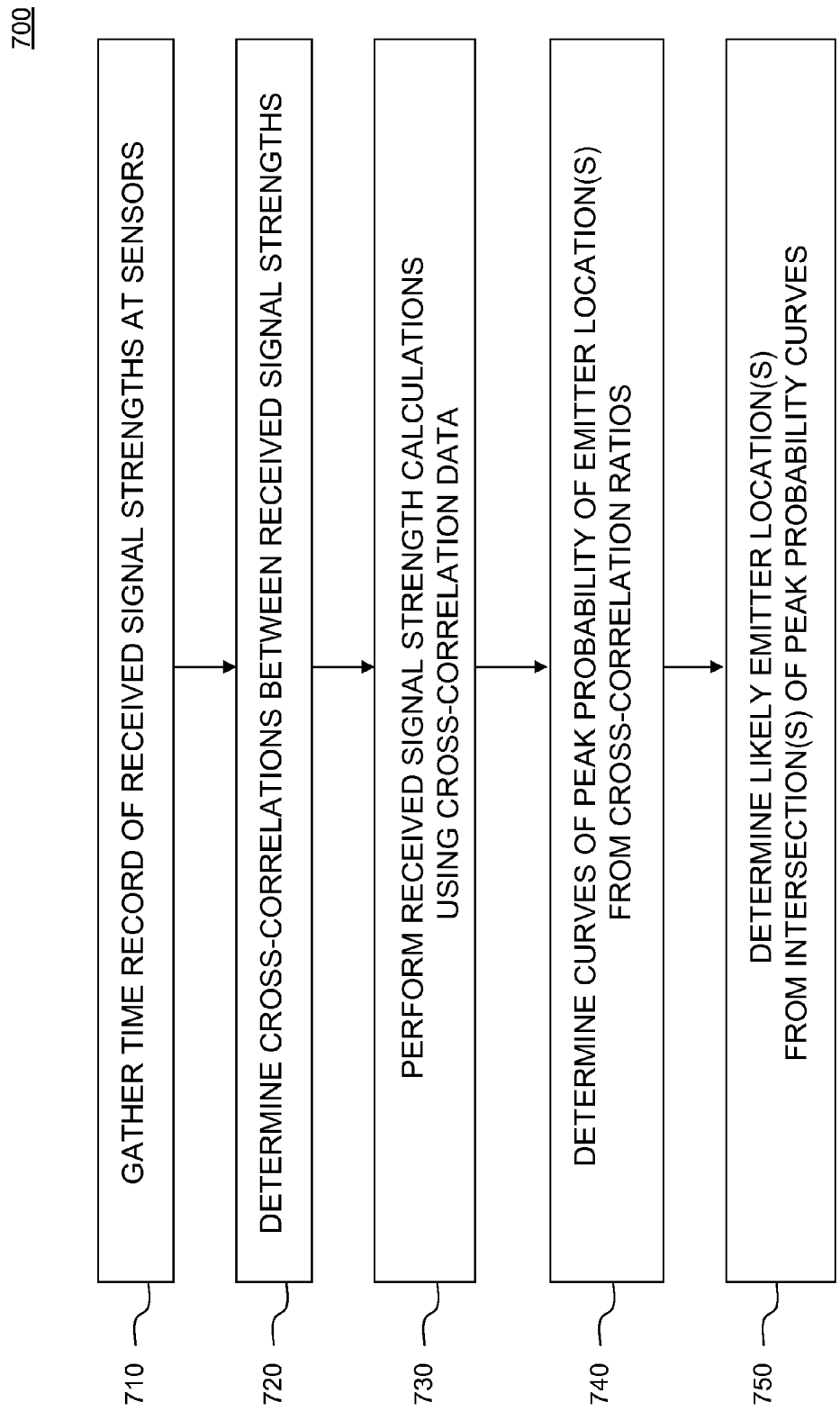
FIG. 7 is a flowchart illustrating one embodiment of a method of locating one or more emitters using the magnitudes of the cross-correlations of received signals from multiple sensors.

FIG. 7 is a flowchart illustrating one embodiment of a method of locating one or more emitters using cross-correlations of received signals from multiple sensors, such as sensors 622, 624 and 626 in emitter location system 600.

In a first step 710, sensors that are provided at known locations each measure received signal strengths of signals received from one or more emitters having unknown locations. In order to insure that cross-correlations of data between the sensors aligns properly, in a beneficial arrangement the sensors are synchronized in time, for example using time controllers 350 as illustrated and described above with respect to FIG. 3. Received signal data may be stored in the sensors (e.g., in memory 330) for processing in the sensor and/or transmission over a network (e.g., network 30).

In a next step 720, cross-correlations of the received signal strengths are determined for various pairs of the sensors. In one embodiment, the cross-correlations may be determined by a central controller or processor that is external to sensors 622, 624 and 626 and may be included in a network to which the sensors are connected (e.g., processor 40). In another embodiment, one or more processors (e.g., processor 320) in sensors 622, 624 and 626 may perform the cross-correlation calculations.

Then, in a step 730, ratios of the peak values of various cross-correlations each involving one common sensor are calculated. For example, in the case of four sensors, the ratios $X_{12}/X_{13}$, $X_{12}/X_{14}$, $X_{12}/X_{23}$, $X_{12}/X_{24}$, $X_{13}/X_{14}$, $X_{13}/X_{23}$, $X_{13}/X_{34}$, $X_{14}/X_{24}$, $X_{14}/X_{34}$, and $X_{23}/X_{24}$ $X_{23}/X_{34}$, and $X_{24}/X_{34}$, are all calculated. In one embodiment, the cross-correlation peak ratios may be determined by a central controller or processor that is external to sensors 622, 624 and 626 and may be included in a network to which the sensors are connected (e.g., processor 40). In another embodiment, one or more processors (e.g., processor 320) in sensors 622, 624 and 626 may determine the cross-correlation peak ratios.

In a subsequent step 740, curves (e.g., circles) are determined for peak probability of emitter location from each of the cross-correlation ratios. In a beneficial embodiment, the curves are plotted on a display screen that may be viewed by a user of the emitter location system 600. In one embodiment, likelihood maps similar to the simulations shown in FIGS. 8-10 below may be generated from signal strength data measured by the sensors and the resultant cross-correlations. For example, such a display may be attached to a central controller or processor (e.g., processor 40) or may be part of a general purpose computer, and may be connected to the emitter location system 600, for example, via the network 30, or via the Internet.

Finally in a step 750, the location(s) of emitter(s) are determined from the areas where the peak probability curves (e.g., circles) intersect each other. In one embodiment, a user may view a display of the curves generated from the cross-correlated data and determine where the emitter(s) are located from the intersection(s) of the curves. In another embodiment, a user may view a display of a likelihood map formed from the cross-correlation data's fit to a path loss model and determine the emitter location based on the area of greatest likelihood. In another embodiment, a processor (e.g., a processor in one of the sensors 622, 624 or 626, or a processor external to sensors 622, 624 and 626 and connected by means of network 30) executes a predetermined algorithm to determine the location(s) of the emitter(s).

Figure 8:
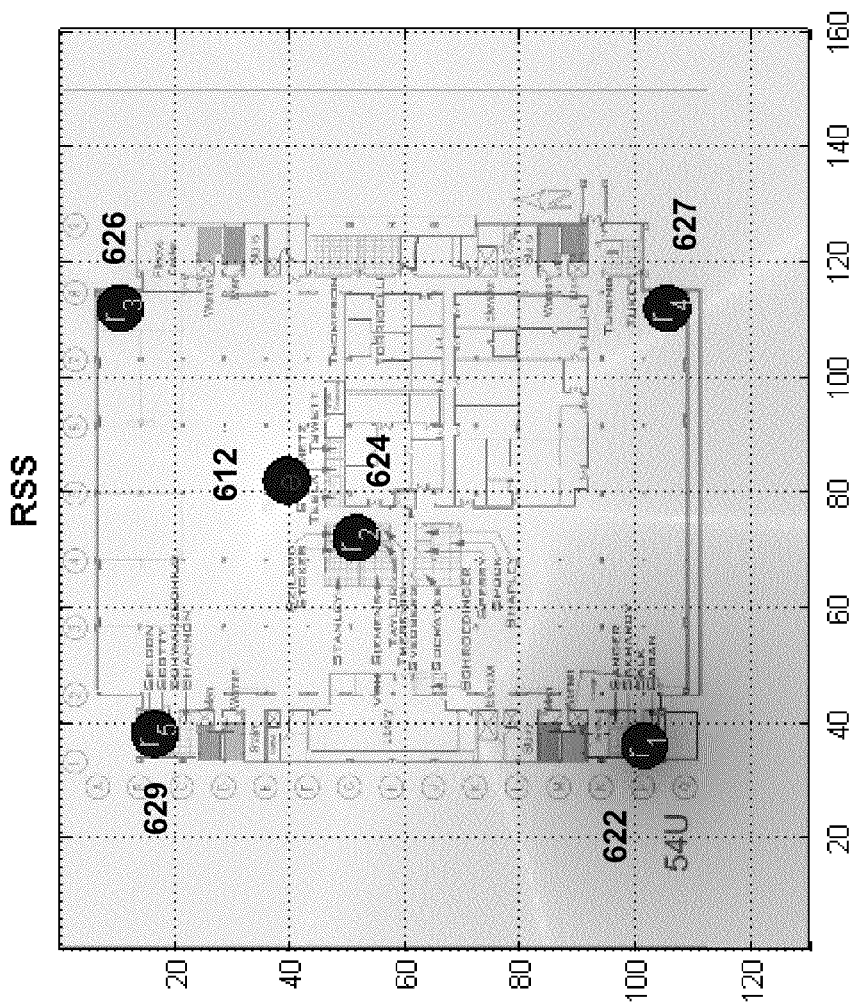
FIG. 8 illustrates the probability of an emitter being at a particular location determined using a received signal strength (RSS) method and a free-space propagation model.
Figure 9:
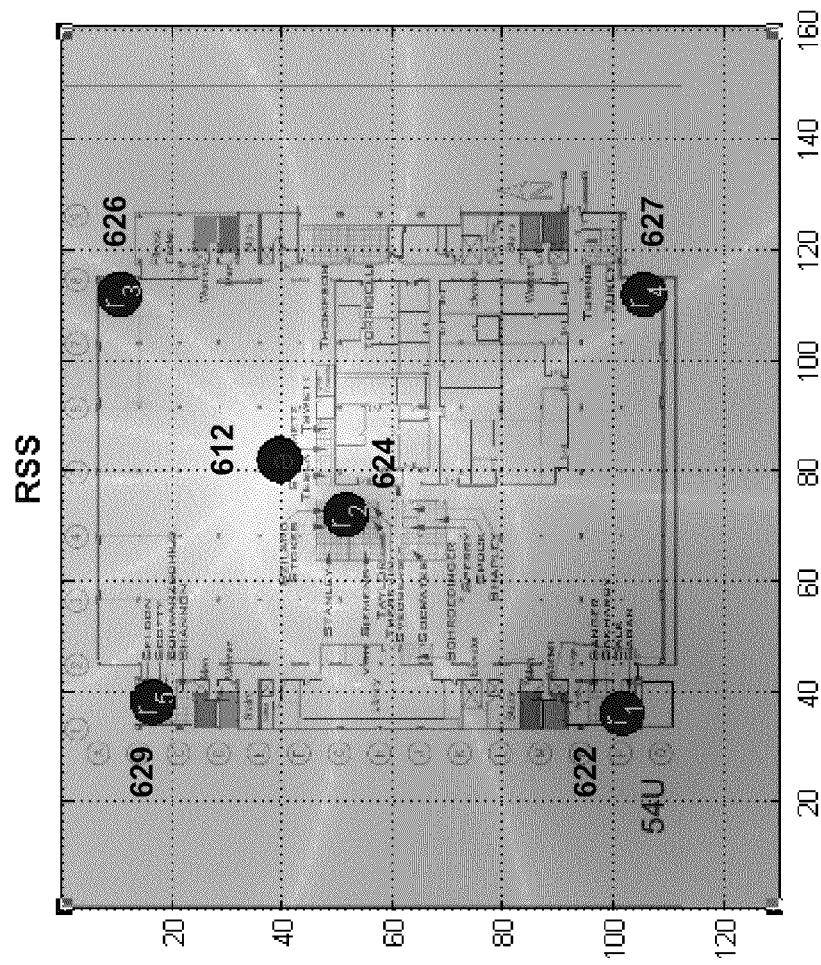
FIG. 9 illustrates the probability of an emitter being at a particular location determined using a method employing peaks of the cross-correlation of received signals and a free-space propagation model.
Figure 10:
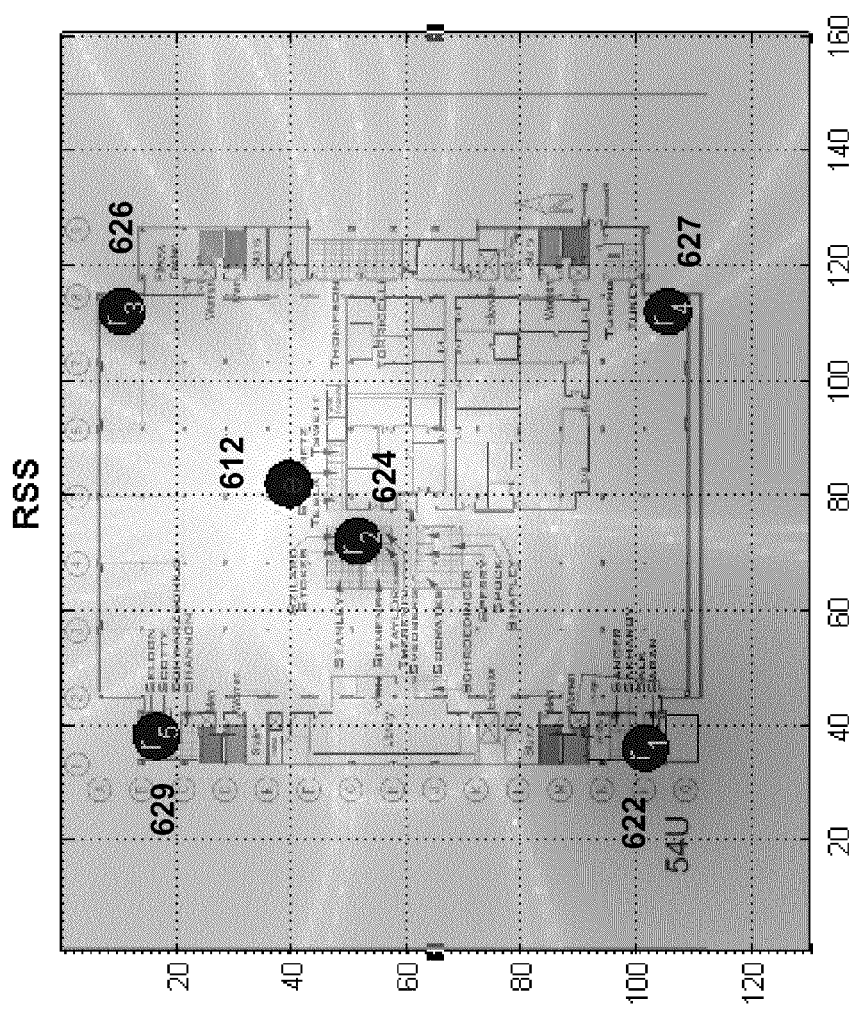
FIG. 10 illustrates the probability of an emitter being at a particular location determined using a method employing time offsets of the cross-correlation of received signals and a free-space propagation model.

FIGS. 8-10 illustrate simulated emitter-location probability plots for an exemplary case of a single emitter 612, and five sensors 622, 624, 626, 627 and 629. Functions similar to 1/(left-hand-side–right-hand-side) of equations (4) and 9) were used in the simulation. In each of the FIGS. 8-10, the darker that a location is, the lower probability that the emitter is located there.

FIG. 8 illustrates the probability of an emitter being at a particular location determined using a received signal strength (RSS) method such as equation (4) and a free-space propagation model. FIG. 9 illustrates the probability of an emitter being at a particular location determined using a method employing peaks of the cross-correlation of received signals and a free-space propagation model. FIG. 10 illustrates the probability of an emitter being at a particular location determined using a method employing time offsets of the cross-correlation of received signals and a free-space propagation model. FIG. 10 employs the ratios of the cross-correlation power at the time offset corresponding to the time difference between the current (X,Y) point on the 2D probability plot and the corresponding receiver pair, $$\frac{X_{12}\tau(x, y)}{X_{13}\tau(x, y)}.$$

While example embodiments are disclosed herein, one of ordinary skill in the art appreciates that many variations that are in accordance with the present teachings are possible and remain within the scope of the appended claims. In particular, exemplary embodiments described above pertained to RF emitters and RF sensors. However, the principles of locating signal emitters using cross-correlation of received signal strengths as set forth above can be applied to a variety of different signals other than RF signals, including other electromagnetic signals (e.g., microwaves) and also acoustic signals. The propagation models used need not be free-space. Ideally these path loss models match the environment in which the sensor system is deployed. In addition, the description above is two dimensional, but the principles could be generalized to 3-dimensions. A solution in three dimensions is the volume of intersection of several spherical surfaces. The embodiments therefore are not to be restricted except within the scope of the appended claims.

The invention claimed is:

1. A method of determining a location of a first device that emits a signal, comprising:
    providing at least three sensors separated and spaced apart from each other;
    at each of the sensors, receiving the signal emitted by the first device;
    acquiring the received signals for each of the sensors;
    determining magnitudes of cross-correlations between the received signals for pairs of the sensors; and
    determining the location of the first device from the magnitudes of the cross-correlations of the received signals.

2. The method of claim 1, further comprising calculating ratios of peak powers of the cross-correlations of the received signals.

3. The method of claim 1, wherein determining the location of the first device from the cross-correlations comprises:
    determining cross-correlation ratios of pairs of the cross-correlations, wherein in each of the pairs of cross-correlations, a pair of sensors for a first one of the cross-correlations in the pair of cross-correlations includes a same sensor as a pair of sensors for a second one of the cross-correlations in the pair of cross-correlations;
    determining peak probability curves for each of the cross-correlation ratios; and
    determining the emitter location as an area where the curves intersect.

4. The method of claim 1, wherein determining the location of the first device from the cross-correlation comprises:
    determining cross-correlation ratios of pairs of the cross-correlations, wherein in each of the pairs of cross-correlations, a pair of sensors for a first one of the cross-correlations in the pair of cross-correlations includes a same sensor as a pair of sensors for a second one of the cross-correlations in the pair of cross-correlations;
    determining a cross-correlation ratio likelihood map for each of the cross-correlation ratios;
    determining a composite likelihood map from a set comprising all of the cross-correlation ratio likelihood maps;
    determining the emitter location as an area on the composite likelihood map with greatest likelihood.

5. The method of claim 1, further comprising calculating ratios of the cross-correlations at a time offset corresponding to a time difference between a point at coordinates x, y on a two-dimensional probability plot, and a corresponding pair of sensors, $$\frac{X_{12}\tau(x, y)}{X_{13}\tau(x, y)},$$

where $\tau(x,y)$ is the time offset at coordinates x, y,
where $X_{12}\tau(x,y)$ is the cross correlation for a first pair of sensors at the time offset $\tau(x,y)$, and
where $X_{13}\tau(x,y)$ is the cross correlation for a second pair of sensors at the time offset $\tau(x,y)$.

6. The method of claim 1, further comprising synchronizing the sensors to have a common sense of time.

7. The method of claim 1, further comprising applying Doppler correction to the received signals.

8. The method of claim 1, further comprising:
    at each of the sensors, receiving a second signal emitted by a second device, the second signal being transmitted at a same time and on a same frequency as the signal emitted by the first device; and
    determining the location of the second device from the magnitudes of the cross-correlations of the received signals.

9. The method of claim 1, wherein the signal is an acoustic signal.

10. The method of claim 1, wherein the signal is an electromagnetic signal.

11. A system for determining a location of a first device that emits a signal, the system comprising:
    at least three sensors separated and spaced apart from each other, each of the sensors including a receiver adapted to receive the signal emitted by the first device and to acquire the received signals for each of the sensors;
    a network connecting the sensors and adapted to communicate data from the sensors;
    means for determining magnitudes of the cross-correlations of the received signals for pairs of the sensors; and
    means for determining the location of the first device from the magnitudes of the cross-correlations of the received signals.

12. The system of claim 11, further comprising a processor, wherein the means for determining the magnitudes of the cross-correlations of the received signals comprises the processor.

13. The system of claim 12, wherein the means for determining the location of the first device from the magnitudes of the cross-correlations of the received signals comprises the processor.

14. The system of claim 12, wherein the processor is included in one of the sensors.

15. The system of claim 14, wherein the means for determining the location of the first device from the magnitudes of the cross-correlations of the received signals comprises the processor.

16. The system of claim 14, wherein the means for determining the location of the first device from the magnitudes of the cross-correlations of the received signals comprises a second processor external to the sensors and connected to the sensors by the network.

17. The system of claim 12, wherein the processor is external to the sensors and is connected to the sensors by the network.

18. The system of claim 17, wherein the means for determining the location of the first device from the magnitudes of the cross-correlations of the received signals comprises the processor.

19. The system of claim 11, further comprising means for calculating ratios of peak powers of the cross-correlations of the received signals.

20. The system of claim 11, wherein the means for determining the location of the first device from the cross-correlations comprises:
   means for determining cross-correlation ratios of pairs of the cross-correlations, wherein in each of the pairs of cross-correlations, a pair of sensors for a first one of the cross-correlations in the pair of cross-correlations includes a same sensor as a pair of sensors for a second one of the cross-correlations in the pair of cross-correlations;
   means for determining peak likelihood curves for each of the cross-correlation ratios; and
   means for determining the emitter location as an area where the curves intersect.

21. The system of claim 11, wherein the means for determining the location of the first device from the cross-correlations comprises:
   means for determining cross-correlation ratios of pairs of the cross-correlations, wherein in each of the pairs of cross-correlations, a pair of sensors for a first one of the cross-correlations in the pair of cross-correlations includes a same sensor as a pair of sensors for a second one of the cross-correlations in the pair of cross-correlations;
   means for determining a cross-correlation ratio likelihood map for each of the cross-correlation ratios;
   means for determining a composite likelihood map from a set comprising all of the cross-correlation ratio likelihood maps;
   means for determining the emitter location as an area on the composite likelihood map with greatest likelihood.

22. The system of claim 11, further comprising means for calculating ratios of the cross-correlations at a time offset corresponding to a time difference between a point at coordinates x, y on a two-dimensional likelihood plot, and a corresponding pair of sensors, $$\frac{X_{12}\tau(x, y)}{X_{13}\tau(x, y)},$$

where $\tau(x,y)$ is the time offset at coordinates x, y,
where $X_{12}\tau(x,y)$ is the cross correlation for a first pair of sensors at the time offset $\tau(x,y)$, and
where $X_{13}\tau(x,y)$ is the cross correlation for a second pair of sensors at the time offset $\tau(x,y)$.

\* \* \* \* \*